United States Patent
Pauly et al.

(10) Patent No.: US 10,445,557 B2
(45) Date of Patent: Oct. 15, 2019

(54) LEARNING PIXEL VISUAL CONTEXT FROM OBJECT CHARACTERISTICS TO GENERATE RICH SEMANTIC IMAGES

(71) Applicant: Definiens AG, Munich (DE)

(72) Inventors: Olivier Pauly, Munich (DE); Nicolas Brieu, Munich (DE); Guenter Schmidt, Munich (DE); Johannes Zimmermann, Hohenschaeftlarn (DE); Gerd Binnig, Kottgeisering (DE)

(73) Assignee: Definiens AG, Munich (DE)

( * ) Notice: Subject to any disclaimer, the term of this patent is extended or adjusted under 35 U.S.C. 154(b) by 275 days.

(21) Appl. No.: 15/668,695

(22) Filed: Aug. 3, 2017

(65) Prior Publication Data

US 2017/0337415 A1  Nov. 23, 2017

Related U.S. Application Data

(63) Continuation of application No. 14/473,096, filed on Aug. 29, 2014, now Pat. No. 9,740,957.

(51) Int. Cl.
  *G06T 7/162*  (2017.01)
  *G06K 9/00*  (2006.01)
  (Continued)

(52) U.S. Cl.
  CPC ......... *G06K 9/0014* (2013.01); *G06K 9/4652* (2013.01); *G06K 9/6209* (2013.01);
  (Continued)

(58) Field of Classification Search
  CPC ......... G06T 7/0012; G06T 2207/10024; G06T 9/40; G06T 2207/20081;
  (Continued)

(56) References Cited

U.S. PATENT DOCUMENTS

| | | | |
|---|---|---|---|
| 4,620,154 A | 10/1986 | Inouye | G01R 33/482 324/309 |
| 5,028,991 A * | 7/1991 | Sekizawa | H04N 1/3872 355/38 |

(Continued)

OTHER PUBLICATIONS

Bueno et al., "Colour Model Analysis 9 for Histopathology Image Processing," Color Medical Image Analysis, Springer Jan. 1, 2013 XP055264084 pp. 165-180 (16 pages).

(Continued)

*Primary Examiner* — Matthew C Bella
*Assistant Examiner* — Dennis Rosario
(74) *Attorney, Agent, or Firm* — Imperium Patent Works; Darien K. Wallace

(57) ABSTRACT

Both object-oriented analysis and the faster pixel-oriented analysis are used to recognize patterns in an image of stained tissue. Object-oriented image analysis is used to segment a small portion of the image into object classes. Then the object class to which each pixel in the remainder of the image most probably belongs is determined using decision trees with pixelwise descriptors. The pixels in the remaining image are assigned object classes without segmenting the remainder of the image into objects. After the small portion is segmented into object classes, characteristics of object classes are determined. The pixelwise descriptors describe which pixels are associated with particular object classes by matching the characteristics of object classes to the comparison between pixels at predetermined offsets. A pixel heat map is generated by giving each pixel the color assigned to the object class that the pixelwise descriptors indicate is most probably associated with that pixel.

20 Claims, 14 Drawing Sheets

(51) Int. Cl.
*G06T 7/00* (2017.01)
*G06K 9/62* (2006.01)
*G06K 9/46* (2006.01)

(52) U.S. Cl.
CPC ......... *G06K 9/6212* (2013.01); *G06K 9/6282* (2013.01); *G06T 7/0012* (2013.01); *G06T 7/162* (2017.01); *G06K 9/4628* (2013.01); *G06K 9/4642* (2013.01)

(58) Field of Classification Search
CPC ............. G06T 2207/30024; G06T 7/11; G06T 2207/10056; G06T 2207/20072; G06T 7/162; G06K 9/0014
See application file for complete search history.

(56) References Cited

U.S. PATENT DOCUMENTS

| | | | | |
|---|---|---|---|---|
| 6,173,083 | B1 | 1/2001 | Avinash | G06T 7/0012 382/132 |
| 6,453,079 | B1 | 9/2002 | McInerny | G06K 9/03 382/311 |
| 7,873,223 | B2* | 1/2011 | Binnig | G06K 9/00127 382/224 |
| 8,139,831 | B2 | 3/2012 | Khamene et al. | G06T 7/0012 382/128 |
| 8,311,344 | B2 | 11/2012 | Dunlop et al. | G06K 9/62 382/224 |
| 8,319,793 | B2 | 11/2012 | Schaepe et al. | G06K 9/00637 345/619 |
| 8,345,976 | B2 | 1/2013 | Wang et al. | G06K 9/6256 382/173 |
| 8,351,676 | B2 | 1/2013 | Dai et al. | G06K 9/00 382/133 |
| 8,699,769 | B2 | 4/2014 | Schoenmeyer et al. | G06T 7/0012 382/128 |
| 9,619,908 | B1* | 4/2017 | Zuczek | G06K 9/6219 |
| 9,740,957 | B2* | 8/2017 | Pauly | G06K 9/0014 |
| 9,805,248 | B2* | 10/2017 | Brieu | G06K 9/4642 |
| 2005/0190955 | A1 | 9/2005 | Brown | G01R 33/56 382/128 |
| 2008/0008349 | A1 | 1/2008 | Binnig et al. | G06K 9/00127 382/100 |
| 2008/0144013 | A1 | 6/2008 | Lanoue et al. | G01J 3/02 356/73 |
| 2010/0184093 | A1 | 7/2010 | Donovan et al. | G06F 19/3437 435/7.21 |
| 2010/0215227 | A1 | 8/2010 | Grunkin et al. | G06F 19/321 382/128 |
| 2010/0265267 | A1 | 10/2010 | Schaepe et al. | G06K 9/00637 345/619 |
| 2012/0226709 | A1 | 9/2012 | Bhargava et al. | G06K 9/6228 707/769 |
| 2013/0077837 | A1* | 3/2013 | Gobinet | G06K 9/6221 382/128 |
| 2018/0053033 | A1* | 2/2018 | Brieu | G06K 9/4642 |

OTHER PUBLICATIONS

Havaei et al., "Efficient Interactive Brain Tumor Segmentation as Within-Brain kNN Classification," Int'l Conf. on Pattern Recognition, IEEE Computer Society, Aug. 24, 2014 XP032698227 ISSN: 1051-4651 pp. 556-561 (6 pages).

Schroff et al., "Object Class Segmentation Using Random Forests," Proceedings of the British Machine Vision Conference, Jan. 1, 2008 XP055264531 ISBN: 978-1-901725-36-0 (10 pages).

European Search Report dated Apr. 21, 2016 by the European Patent Office in the European patent application EP15178864.3 that claims priority to the parent of this application (12 pages).

Thomas et al., "Visualization fo High Resolution Spatial Mass Spectrometric Data during Acquisition," Aug. 28-Sep. 1, 2012 [retrieved Sep. 9, 2016], 2012 Annual Int'l Conf. IEEE Engineering in Medicine and Biology Society, pp. 5545-5548 http://ieeexplore.ieee.org/document/6347250.

DiFranco et al., "Ensemble based system for whole-slide prostate cancer probability mapping using color texture features," Oct.-Dec. 2011 [retrieved Sep. 9, 2016], Computerized Medical Imaging and Graphics, vol. 35, Issues 7-8, pp. 629-645 http://www.sciencedirect.com/science/article/pii/S0895611110001369.

\* cited by examiner

LEARNING PIXEL VISUAL CONTEXT FROM OBJECT CHARACTERISTICS TO GENERATE RICH SEMANTIC IMAGES

CROSS REFERENCE TO RELATED APPLICATIONS

This application is a continuation of, and claims priority under 35 U.S.C. § 120 from, nonprovisional U.S. patent application Ser. No. 14/473,096 entitled "Learning Pixel Visual Context from Object Characteristics to Generate Rich Semantic Images," now U.S. Pat. No. 9,740,957, filed on Aug. 29, 2014, the subject matter of which is incorporated herein by reference.

TECHNICAL FIELD

The present invention relates generally to analyzing target patterns in digital images, and more specifically to a computer-implemented system for detecting and measuring those target patterns.

BACKGROUND

Cancer is typically diagnosed by analyzing stained samples of tissue from cancer patients and then correlating target patterns in the tissue samples with grading and scoring methods for different kinds of cancers. For example, the Gleason grading system indicates the malignancy of prostate cancer based on the architectural pattern of the glands of a stained prostate tumor. In addition, breast cancer can be diagnosed by grading stained breast tissue using the Allred score, the Elston-Ellis score or the HercepTest™ score. The Allred score indicates the severity of cancer based on the percentage of cells that have been stained to a certain intensity by the estrogen receptor (ER) antibody. The Elston-Ellis score indicates the severity of cancer based on the proportion of tubules in the tissue sample, the similarity of nucleus sizes and the number of dividing cells per high power field of 400× magnification. The HercepTest™ score indicates the severity of cancer based on the level of HER2 protein overexpression as indicated by the degree of membrane staining. The Fuhrman nuclear grading system indicates the severity of renal cell carcinoma (RCC) based on the morphology of the nuclei of kidney cells.

But the various cancer scoring and grading systems can deliver inconsistent results because even an experienced pathologist may misjudge the target patterns and structures in the stained tissue due to fatigue and loss of concentration. Therefore, computer-assisted image analysis systems have been developed to support pathologists in the tedious task of grading and scoring digital images of the stained tissue samples. The digital images are rectangular arrays of pixels. Each pixel is characterized by its position in the array and a plurality of numerical pixel values associated with the pixel. The pixel values represent color or grayscale information for various image layers. For example, grayscale digital images are represented by a single image layer, whereas RGB images are represented by three color image layers. Some existing image analysis systems apply semantic networks to analyze the contents of the digital images. These systems segment, classify and quantify objects present in the images by generating semantic networks that link pixel values to data objects according to class networks. The image analysis systems that apply semantic networks perform object-oriented analysis, as opposed to solely statistical pixel-oriented analysis. Consequently, semantic network systems classify not just pixels, but also the data objects linked to the pixels. The data objects that are linked to the pixels and to one another represent information about the digital images.

Although object-oriented image analysis can provide better results for cancer scoring and grading systems than can pixel-oriented analysis alone, object-oriented analysis is also more computationally involved. Therefore, object-oriented analysis is often slower than statistical pixel-oriented analysis alone. Particularly in digital pathology where each tissue slide can generate gigapixels of data, performing a full-scale object-oriented analysis is too time-consuming. A method is sought that retains the advantages of object-oriented analysis, yet enhances the performance of analysis systems based on computer-implemented semantic networks. Such a method would efficiently manage the computational resources of the object-oriented image analysis systems.

SUMMARY

An image analysis method uses both object-oriented analysis and the faster pixel-oriented analysis to recognize patterns in a digital image of a stained tissue slice. Object-oriented image analysis is used to segment a small portion of the image into object classes. Then the object class to which each pixel in the remainder of the image most probably belongs is determined using decision trees that include pixelwise descriptors. The pixels of the remainder of the image are assigned object classes without segmenting the remainder of the image into objects of a semantic network. After the small portion of the image is segmented into object classes, class characteristics of each of the classes of objects are determined. The pixelwise descriptors as applied in decision trees describe which pixels are associated with particular classes of objects by matching the characteristics of the object classes to the comparison between pixels at predetermined offsets. A pixel heat map is generated by giving each pixel the color assigned to the class of objects that the pixelwise descriptors indicate is most probably associated with that pixel.

An image analysis method trains decision trees of pixelwise descriptors to indicate the probability that individual pixels in one portion of an image exhibit object characteristics determined by segmenting another portion of the image using the more computationally intensive object-oriented image analysis. A high-resolution digital image of stained tissue is first divided into tiles, and the degree of local contrast in each of the tiles is determined. A first plurality of the tiles is selected that exhibits the greatest degree of local contrast. The average color of each of the first plurality of tiles is determined. The first plurality of tiles is then divided into clusters of tiles having similar colors. A learning tile from each color cluster of tiles is selected. Each learning tile has the greatest degree of local contrast from among the tiles of the color cluster to which the learning tile belongs.

The learning tiles are then segmented into objects using computationally intensive object-oriented image analysis that generates rich semantic images. As part of the object-oriented segmentation, the objects are classified into classes of objects, and a color is associated with each class of objects. Characteristics of the objects that belong to distinct object classes are determined. Some examples of the object characteristics are: the average number of concavities of the objects of the class, the average size of the objects of the class, the variation in sizes among the objects of the class, the amount of intensity variation within the objects of the class, the elliptical fit of the objects of the class, and the average intensity of the objects of the class. Pixelwise descriptors in decision trees are generated that indicate the class of objects to which each characterized pixel of the learning tiles most probably belongs by matching the object characteristics to a comparison between the characterized pixel and a second pixel at a predetermined offset. The comparison between pixels provides the visual context for matching each pixel to an object class. Examples of the pixelwise descriptors include: the difference between a color value of the characterized pixel and of a second pixel at a predetermined offset, the average of the color values of pixels in a box of predetermined size at a predetermined offset from the characterized pixel, the standard deviation among the color values of pixels in a box of predetermined size at a predetermined offset from the characterized pixel, the sum of gradient magnitude of the color values of pixels in a box of predetermined size at a predetermined offset from the characterized pixel, the orientation of a gradient edge at a predetermined offset, and the color value of a second pixel at a predetermined offset.

By applying the pixelwise descriptors to each pixel of the digital image, including pixels outside the learning tiles, a pixel heat map is generated in which each pixel is assigned the color associated with the class of objects to which that pixel most probably belongs. The pixel heat map is generated without again segmenting the digital image into objects. The pixel heat map is then displayed on a graphical user interface.

In another embodiment, object characteristics are determined of objects segmented in a first portion of an image using object-oriented image analysis. Pixelwise descriptors then describe which of the object characteristics that a characterized pixel most probably exhibits based on a quality of a second pixel at a predetermined offset from the characterized pixel. Thus, each characterized pixel is matched to the most probable of selected object characteristics as opposed to the most probable of selected object classes. A pixel heat map is generated by applying the pixelwise descriptors to each pixel in a second portion of the image without segmenting the second portion of the image into objects. Each pixel of the second portion of the image has the color assigned to the object characteristic most probably exhibited by that pixel.

In yet another embodiment, a higher level heat map is generated from the pixel heat map that assigns a color to each pixel depending on the degree to which an object characteristic is most likely exhibited at the location of the pixel. An average value of multiple pixels of the pixel heat map can be combined to form a single pixel of the higher level heat map. The shade of each pixel of the higher level heat map indicates an area of the original image in which the objects exhibit an object characteristic to a particular degree. For example, the shade of each pixel of the higher level heat map could indicate a location in the original image in which cells have a higher proportion of their membranes immunohistochemically stained. In another example, the shade of each pixel of the higher level heat map could indicate a location in the original image in which the nuclei have an above-average size. Thus, pixels of the higher level heat map most probably belonging to areas in the original image containing larger nuclei are assigned a particular color.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
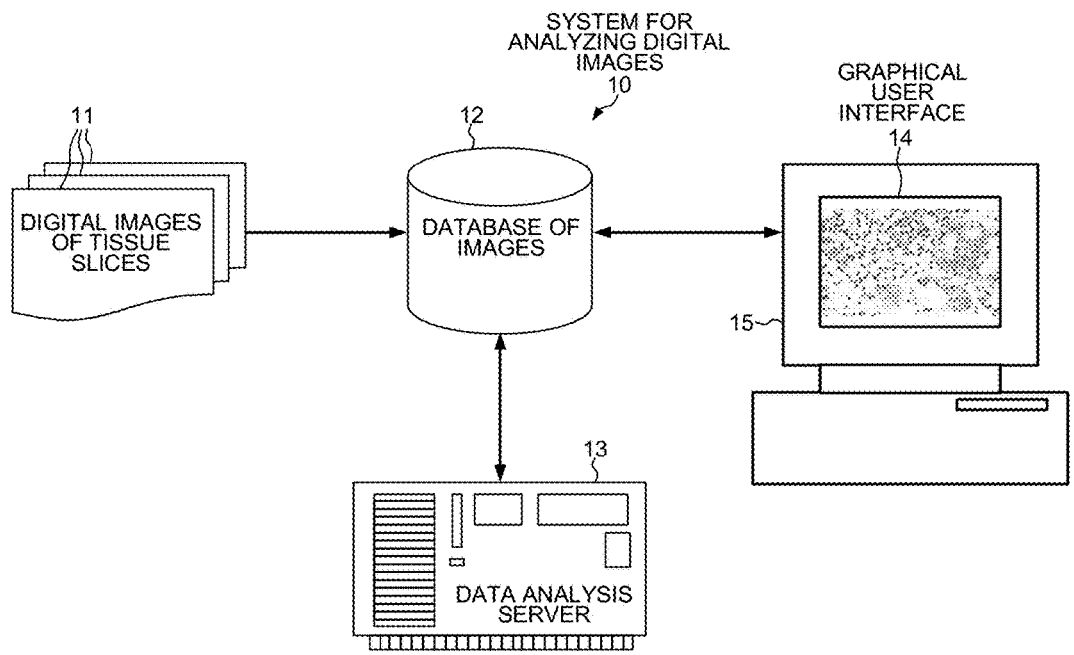
FIG. 1 is a diagram of a system for analyzing digital images using both statistical pixel-oriented analysis and object-oriented analysis that links pixels to data objects forming hierarchical networks.

FIG. 1 shows a system 10 for analyzing digital images using both statistical pixel-oriented analysis and object-oriented analysis that links pixels to data objects forming hierarchical networks. System 10 is used to analyze images of tissue slices stained with various biomarkers, such as tissue stained with hematoxylin and eosin (H&E) or tissue stained with a protein-specific antibody using immunohistochemistry (IHC). Digital images 11 of the stained tissue slices are acquired at high magnification. A typical digital image of a tissue slice has a resolution of 100,000×200,000 pixels, or 20 billion pixels. The acquired digital images 11 are stored in a database 12 of digital images. Image analysis software executing on a data analysis server 13 then performs intelligent image processing and automated classification and quantification. The image analysis software is a computer program product tangibly embodied on a computer-readable storage medium in server 13 and comprises computer readable and executable program instructions that when executed by a processor on server 13 provide a visual display on a graphical user interface 14 of an interconnected display device 15, such as a personal computer. The image analysis software transforms unlinked input data in the form of pixels into a hierarchical semantic network of objects.

System 10 analyzes, grades, scores and displays the digital images 11 of tissue slices that have been stained with various biomarkers. The image analysis program segments and classifies objects in the digital images 11. The program prepares links between some objects and thereby generates higher hierarchically ranked objects. The image analysis program provides the higher hierarchically ranked objects with properties, classifies them, and then links those objects again at a still higher level to other objects. The higher hierarchically ranked objects are used to find target patterns in the images. More easily detected starting data objects are first found and then used to identify harder-to-find data objects in the hierarchical data structure.

Figure 2:
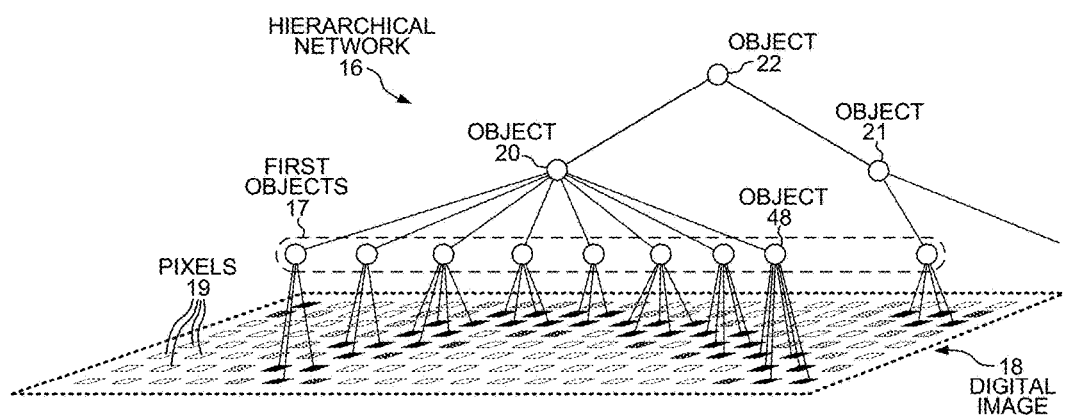
FIG. 2 illustrates a data network generated by the system of FIG. 1 in which data objects of a hierarchical network are linked to selected pixels of an image of a stained tissue.

FIG. 2 illustrates exemplary hierarchical network 16 that is generated by image analysis system 10. System 10 generates first objects 17 from a digital image 18 based on the stained tissue. The image analysis program of system 10 uses object-oriented image analysis to generate data objects of hierarchical semantic network 16 by linking selected pixels 19 to data objects according to a classification network and according to a process hierarchy of steps and algorithms. For a more detailed description of generating a data network using a process hierarchy and a class network, see U.S. Pat. No. 8,319,793, the contents of which are incorporated herein by reference. Each digital image comprises pixel values associated with the locations of each of the pixels 19. The image analysis program operates on the digital pixel values and links the pixels to form objects. Each object is linked to a set of pixel locations based on the associated pixel values. For example, an object is generated by linking to the object those pixels having similar characteristics, such as hue, saturation and brightness as defined by the pixel values. Alternatively, the pixel values can be expressed in a 3-value color space. For example, in the RGB color space, three 3-digit numbers in the range from zero to 255 define the color. The three numbers represent the amounts of red, green and blue in the represented color. For example, red is represented as 255-0-0, dark green is represented as 0-100-0, royal blue is designated as 65-105-225, white is represented as 255-255-255, and black is represented as 0-0-0. Smaller numbers represent darker colors, so 100-100-100 is a darker gray than 200-200-200, and 0-0-128 is a darker blue (navy) than straight blue 0-0-255. Although the operation of system 10 is described in relation to the RGB color space, other color spaces and representations may also be used, such as the CMYK (cyan, magenta, yellow, black) color model, the CIE 1931 color space, the 1964 xyz color space or the HSV and HSL representation of the RGB color space. Thresholds of brightness at pixel locations that are grouped together can be obtained from a histogram of the pixel values in the digital image. The pixels form the lowest hierarchical level of hierarchical network 16.

In one example, pixels having the color and intensity imparted by the biomarker stain are identified and linked to first objects 17. The first objects 17 form the second hierarchical level of hierarchical network 16. Then data objects are linked together into classes according to membership functions of the classes defined in the class network. For example, objects representing nuclei are linked together to form objects 20-21 in a third hierarchical level of hierarchical network 16. In FIG. 2, some of the first objects 17 correspond to stained pixels of the nuclear membrane of a nucleus corresponding to object 20. In addition, another of the first objects 17 corresponds to stained pixels on the nuclear membrane of a separate nucleus represented by object 21. An additional object 22 is generated in a fourth hierarchical level of hierarchical network 16 and is linked to all of the objects that represent stained nuclei. Thus, the objects 20-21 corresponding to stained nuclei are linked to object 22.

The knowledge and the program flow of the image analysis program are separated in the software structure. The parameters by which the image analysis is performed, for example thresholds of size or brightness, can be changed without having to revise the process hierarchy of software steps. The image analysis software displays both the original digital images 11 as well as the corresponding processed images and heat maps on the graphical user interface 14. Pixels corresponding to classified and segmented objects in the digital images are colored, marked or highlighted to correspond to their classification. For example, the pixels of objects that are members of the same class are depicted in the same color.

Figure 3:
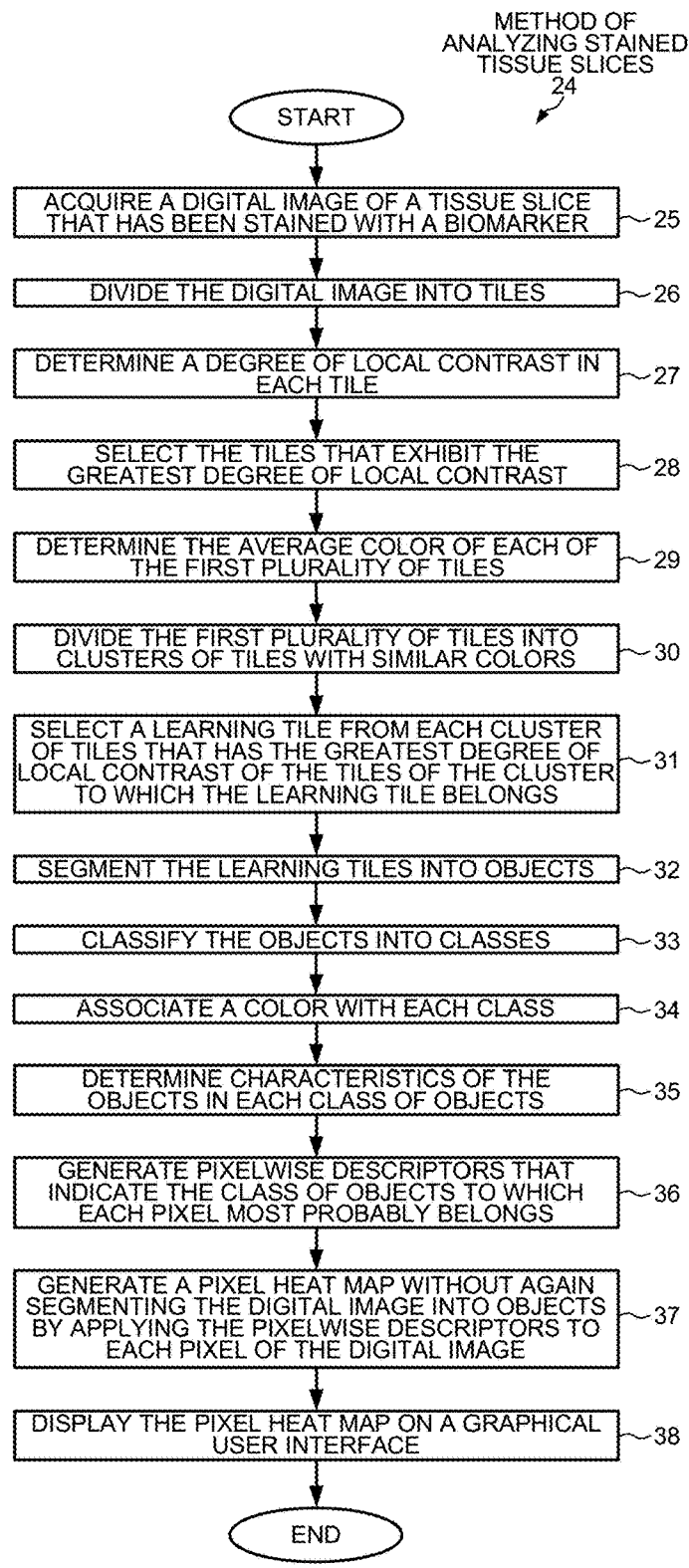
FIG. 3 is a flowchart of steps by which the system of FIG. 1 recognizes patterns in digital images of stained tissue slices using both object-oriented analysis and pixel-oriented analysis.
Figure 4:
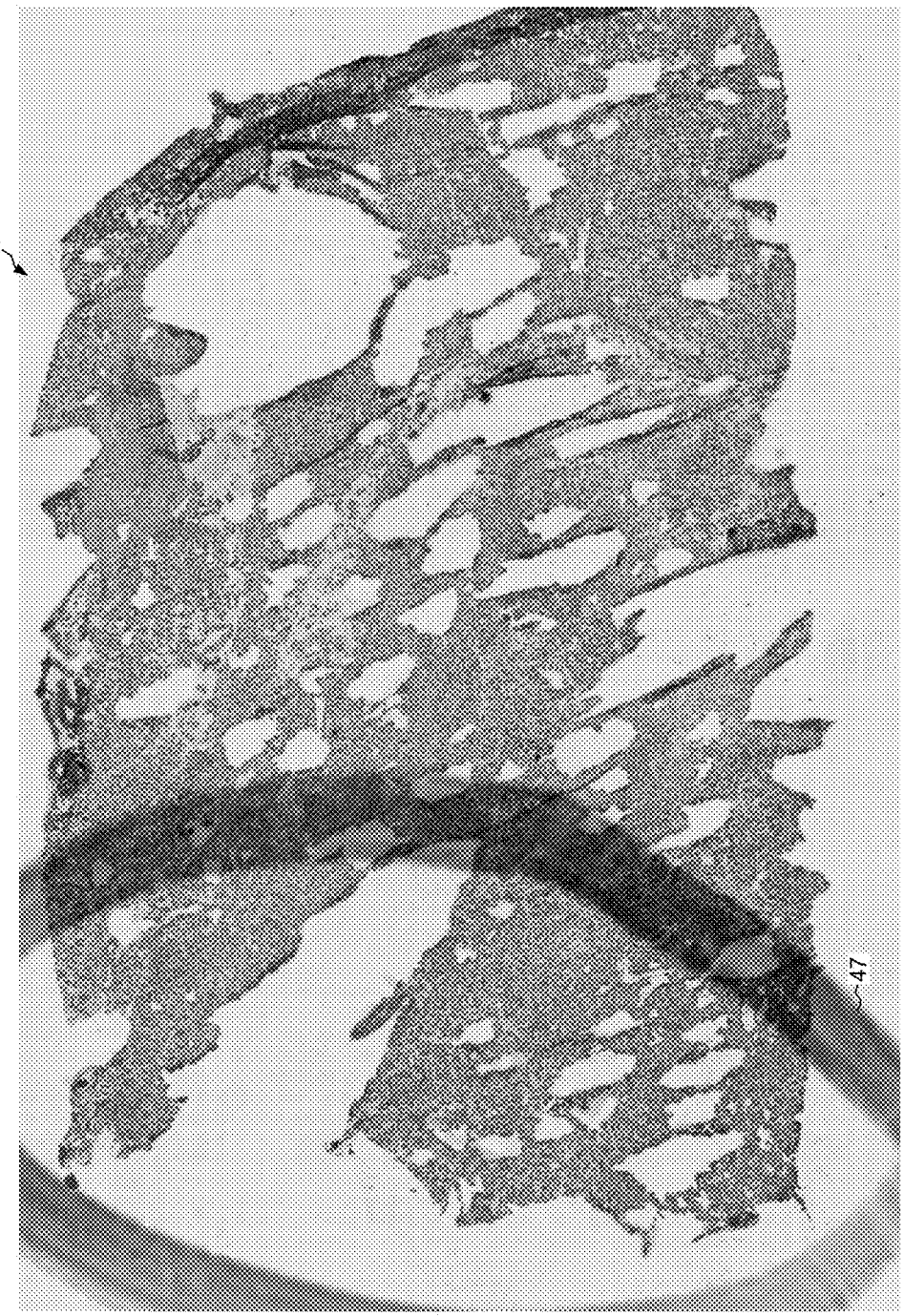
FIG. 4 shows a high-resolution digital image of kidney tissue that has been stained with hematoxylin and eosin (H&E).

FIG. 3 is a flowchart of steps 25-38 of a method 24 by which analysis system 10 recognizes patterns in digital images of stained tissue slices using both object-oriented analysis and pixel-oriented analysis. In a first step 25, a high-resolution digital image is acquired of a tissue slice that has been stained with a biomarker. FIG. 4 shows an exemplary digital image 46 of kidney tissue that has been stained with hematoxylin and eosin (H&E). A slice of the kidney tissue has been placed on a slide before the digital image was scanned. The image includes an artifact 47 of a pen mark in which an area of the tissue has been circled.

Figure 5:
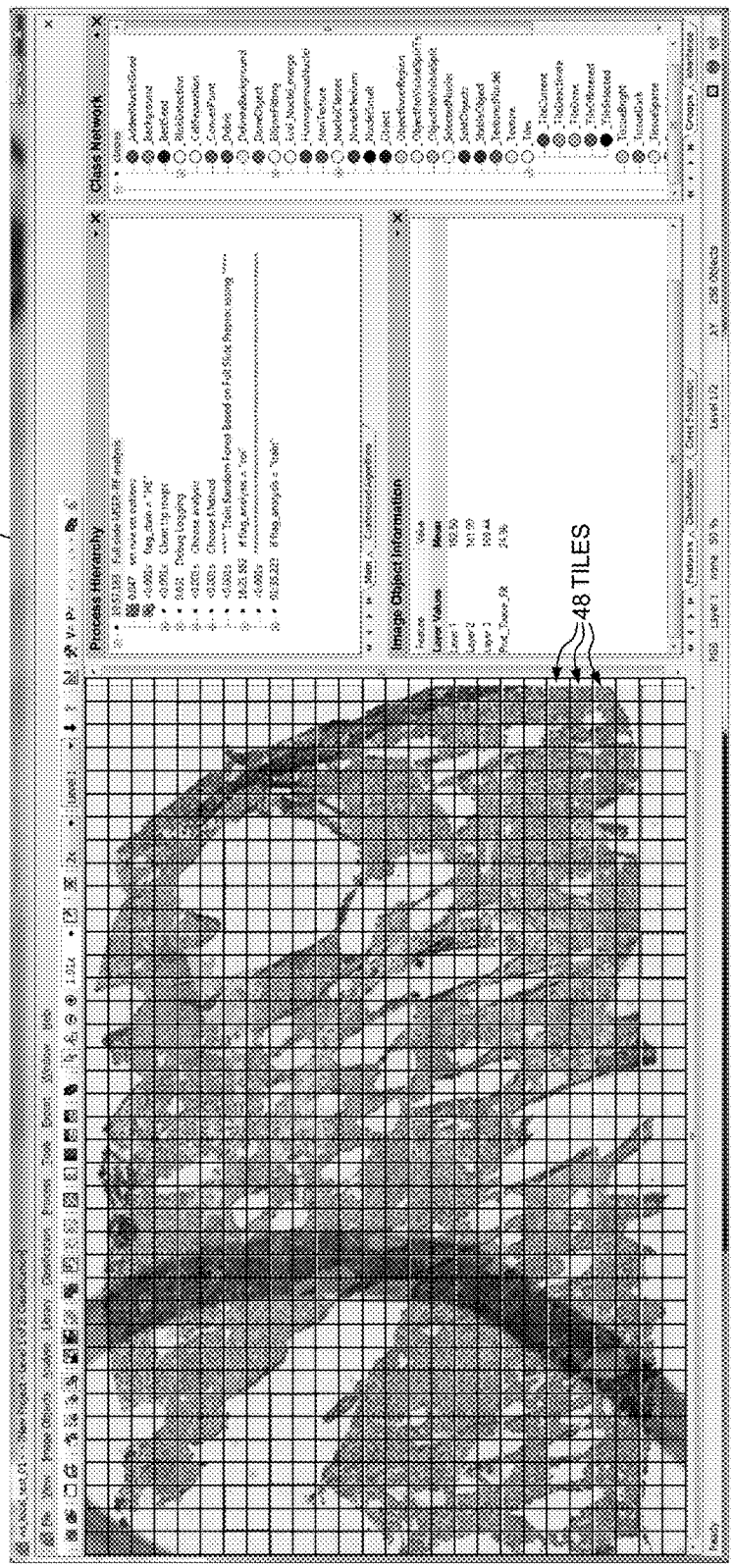
FIG. 5 is a screenshot of the graphical user interface of the system of FIG. 1 in which the image of FIG. 4 is displayed in tiled sections.

In a next step 26, high-resolution digital image 46 is divided into tiles 48. FIG. 5 shows how digital image 46 is displayed in tiled sections 48 on graphical user interface 14 of system 10 after step 26 is performed.

In step 27, system 10 determines the degree of local contrast in each of the tiles 48. First, an intensity threshold is set at the average intensity of the pixels in each tile. The pixels are divided into a first group whose intensities are above the threshold and a second group whose intensities are below the threshold. Regions of contiguous pixels in the first and in the second groups are then identified. Then the intensity threshold is incrementally changed and the regions of contiguous pixels in the two groups are again identified. The regions that remain stable despite the change in the intensity threshold are defined as maximally stable extremal regions (MSER). The ratio of the area covered by stable regions (MSER) in each tile is determined. A higher ratio of stable regions indicates a greater degree of local contrast.

Figure 6:
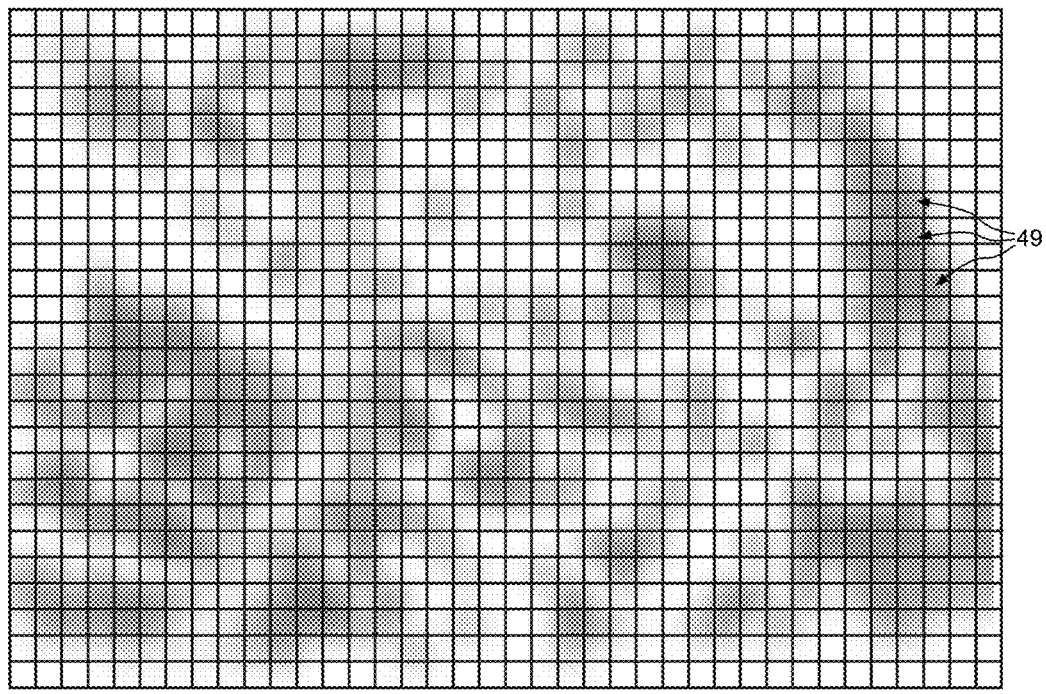
FIG. 6 shows how the system of FIG. 1 displays the tiles of FIG. 5 to represent the degree of local contrast in each tile.

FIG. 6 shows how the tiles 48 are displayed on graphical user interface 14 to represent the degree of local contrast in each tile. The darker areas 49 in FIG. 6 indicate the location of maximally stable extremal regions (MSER) that remain despite an incremental change in the intensity threshold. The darker areas 49 indicating a greater degree of local contrast tend to contain more relevant and a wider variety of tissue types.

Figure 7:
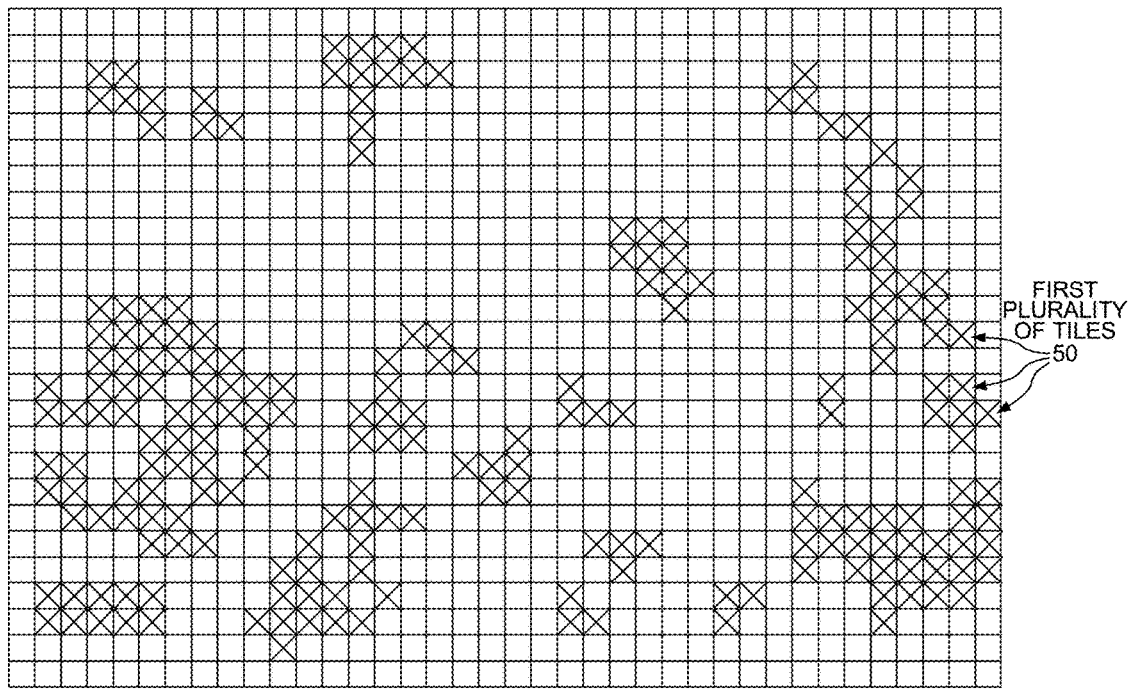
FIG. 7 shows 212 of the tiles of FIG. 5 marked with an "X" to indicate the tiles with the greatest degree of local contrast.

In step 28, a first plurality 50 of the tiles 48 are selected that exhibit the greatest degree of local contrast. The tiles covered by the greatest ratio of darker areas 39 and that contain the darkest darker areas are selected as the first plurality of tiles 50. Of the 988 total tiles shown in FIG. 7, 212 of the tiles are marked with an "X" to indicate the first plurality of tiles. The remaining unmarked tiles contain less interesting tissue that is less likely to include representative amounts of all tissue types. By selecting only those tiles with the greatest contrast and the greatest portion of high-contrast area, the background tiles containing no tissue are also removed.

In step 29, the average color of each of the first plurality of tiles 50 is determined. Each of the tiles 50 is a matrix of pixel locations associated with numerical pixel values. In this embodiment, the pixel values represent the color of each pixel in the RGB color space and include three 3-digit numbers in the range from zero to 255. The three numbers represent the amounts of red, green and blue in the color of the pixel. For all of the pixels in each tile, the average red number, green number and blue number are calculated. The three average numbers represent a point in RGB space. A point in RGB space is determined for each of the 212 tiles in the first plurality of tiles 50. The 212 points in RGB space form a cloud. In an alternative embodiment, the colors of the tiles can be determined using lower resolution versions of the first plurality of tiles 50. Multiple pixels of each of the tiles 50 are represented by a single pixel of each lower resolution tile.

Figure 8:
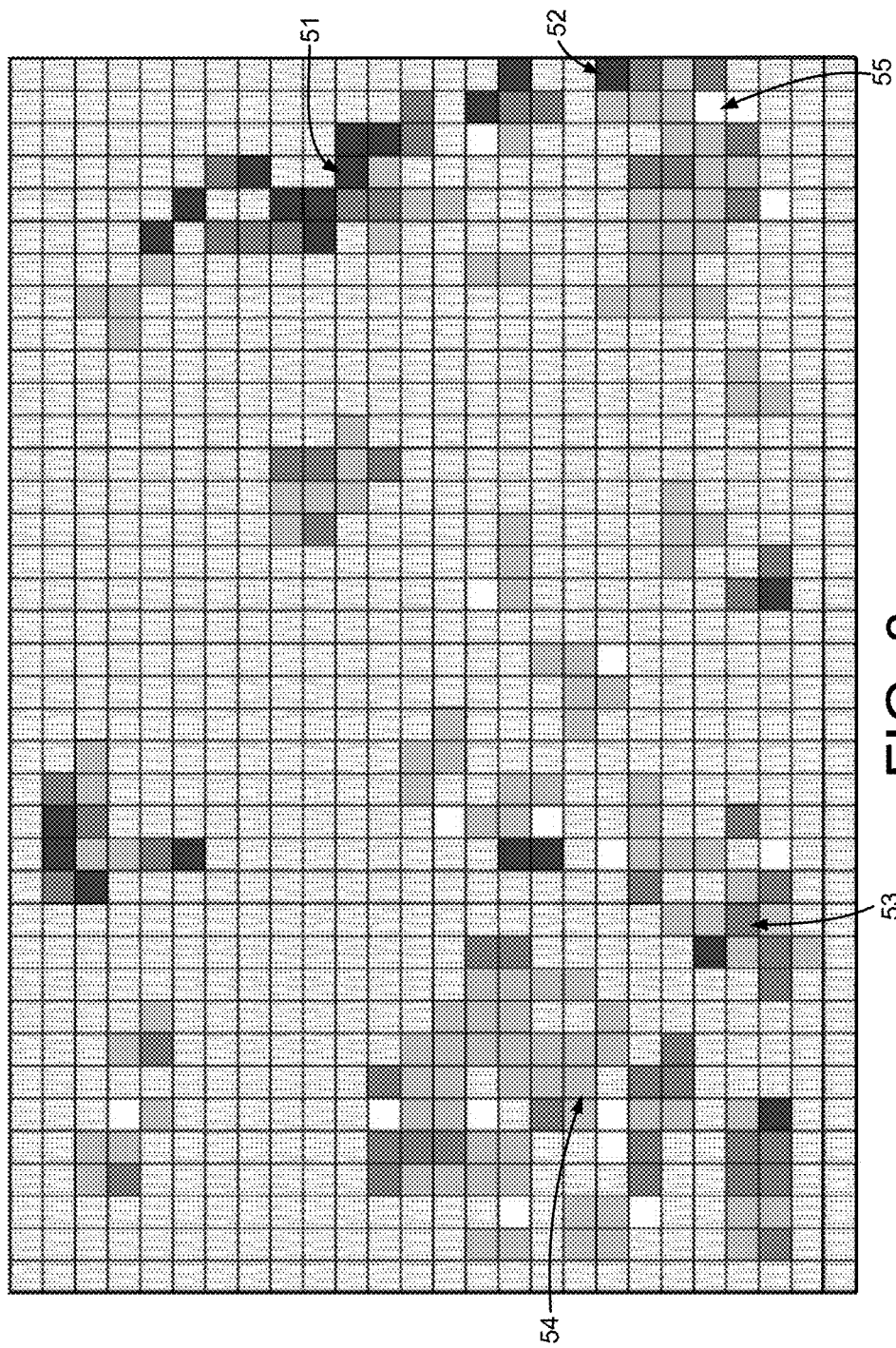
FIG. 8 shows each of the 212 tiles of FIG. 5 displayed in a shade of gray corresponding to one of five color clusters.

In step 30, the first plurality of tiles 50 (or the lower resolution versions of these tiles) is divided into clusters of tiles with similar colors. The cloud of points in RGB space is divided into five areas of concentration of the points. The points in each of the five areas correspond to color clusters of the tiles 50. FIG. 8 shows a matrix of tile locations in which each of the first plurality of tiles 50 is displayed in a shade of gray corresponding to one of the five color clusters. For example, sixteen of the 212 first plurality of tiles 50 are in the color cluster represented by white.

Figure 9:
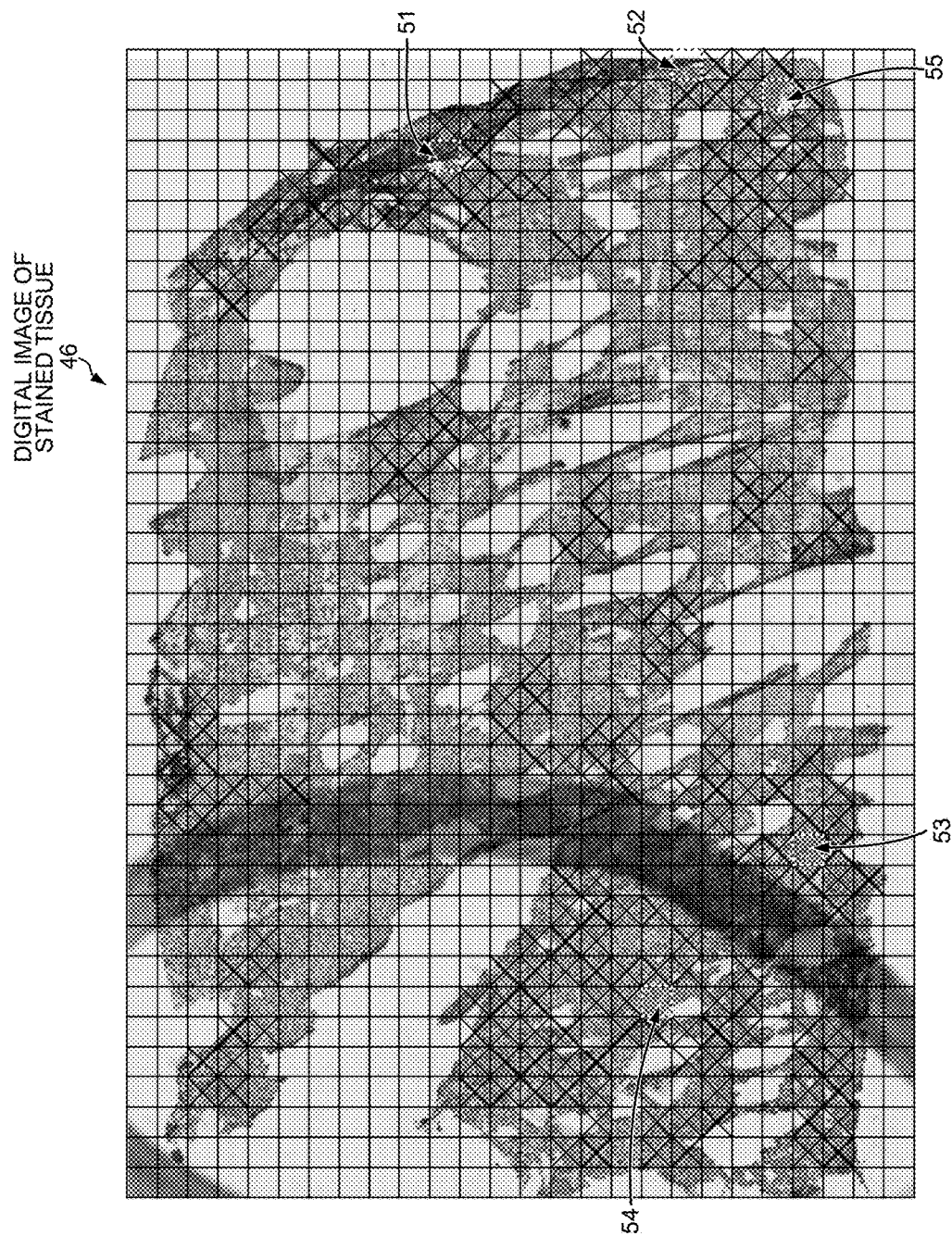
FIG. 9 shows the locations on the image of FIG. 4 of five learning tiles as well as the locations of the remainder of the tiles with the greatest degree of local contrast marked with Xs.

In step 31, a learning tile is selected from each cluster of tiles. From each color cluster of tiles, the tile is selected that has the highest proportion of stable regions. Thus, each learning tile exhibits the greatest degree of local contrast from among the tiles of the cluster to which the learning tile belongs. In FIG. 8, the five learning tiles from each of the five color clusters are labeled 51-55. For example, tile 55 is the tile that exhibits the greatest degree of local contrast from among the tiles in the color cluster represented by white. FIG. 9 shows the locations on digital image 46 of learning tiles 51-55 as well as the locations of the remainder of the first plurality of tiles 50, which are marked with Xs.

In step 32, the learning tiles 51-55 are segmented into data objects using object-oriented image analysis. In step 33, the data objects are classified into classes of objects. And in step 34, a color is associated with each class of objects. Typically, a class network is first defined, and colors are associated with the defined classes. Then the pixels are linked to subobjects, and the subobjects are combined into objects that correspond with the classes in the class network.

The image analysis program analyzes and measures patterns present in the pixels using a computer-implemented network structure. The network structure includes a hierarchical data network, a class network and a process hierarchy. The data objects of the hierarchical data network are generated by linking selected pixels of the learning tiles 51-55 to the data objects according to the classification network using the steps and algorithms of the process hierarchy. In object-oriented processing, a data object is formed based on whether a condition would be satisfied if a particular pixel were to be linked to the object. For example, whether a pixel is linked to a data object can depend on the shape or size of the object that would result if the pixel were included in the object. Whether a pixel is linked to an object can also depend on the average brightness of all of the pixels associated with the object that would result if the particular pixel were to be included in the object. The objects are combined in the hierarchical data network to form higher level objects, which are classified into classes of the class network.

Object-oriented image analysis can produce better segmentation than pixel-oriented analysis because subobjects can be combined in alternative ways, and the best result can then be chosen. Multiple segmentation strategies can be simultaneously pursued by concurrently computing alternative object classifications (segmentation of objects into classes) using several cores of a multi-core computer. Combining subobjects in alternative ways to produce the best overall segmentation is not possible with solely pixel-oriented processing in which no hierarchical data network is generated.

Figure 10:
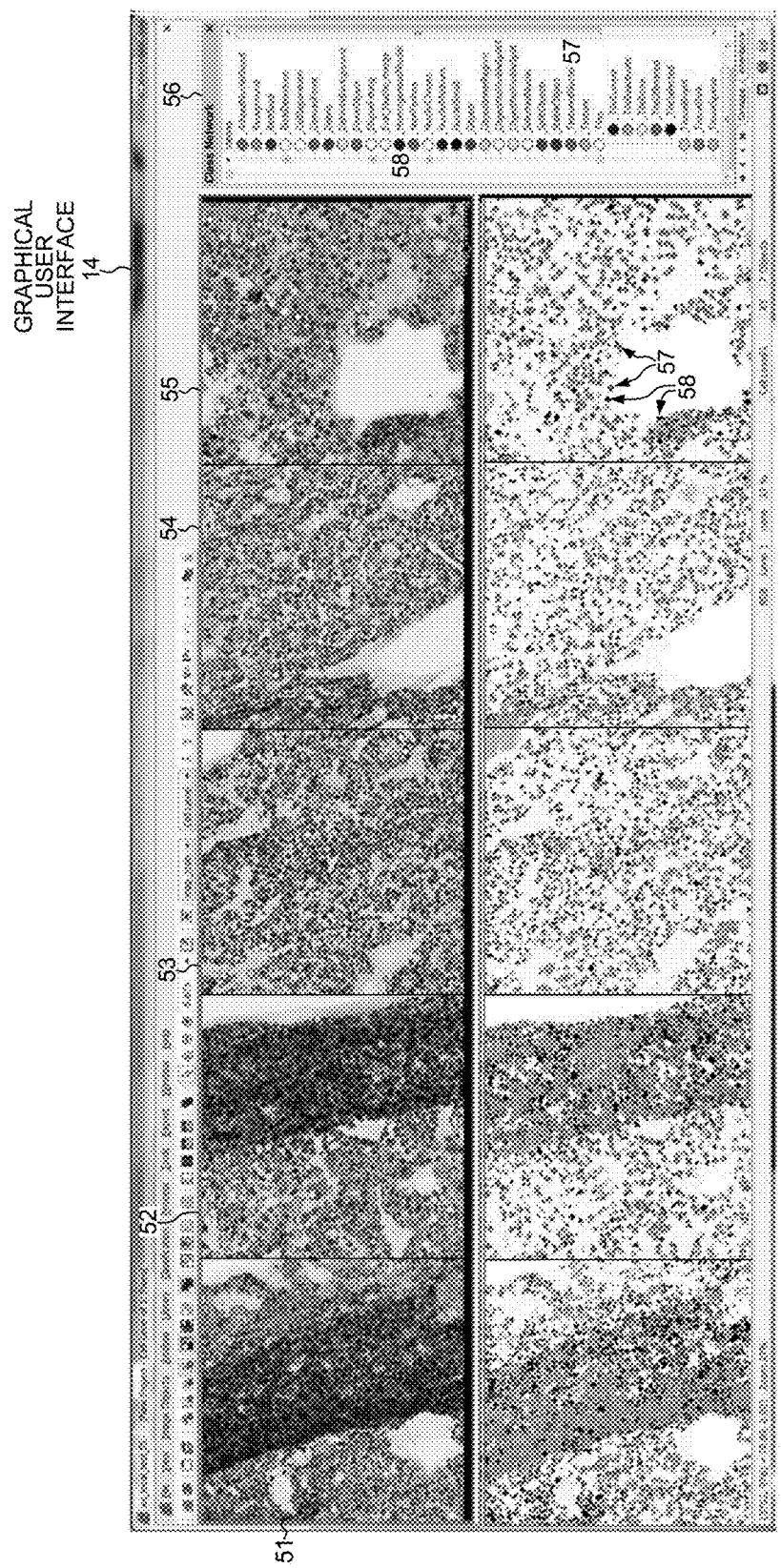
FIG. 10 is a screenshot of the graphical user interface of the system of FIG. 1 in which the five learning tiles identified in FIG. 9 are displayed side-by-side in the top row.

FIG. 10 is a screenshot of graphical user interface 14 on which the five learning tiles 51-55 are displayed side-by-side in the top row. Object-oriented image analysis has been performed on the learning tiles 51-55, and data objects have been segmented and classified into the classes in the class network 56 at the right side of graphical user interface 14. The results of the segmentation are shown in the row of images below the row of learning tiles. Through the computationally intensive algorithms of the process hierarchy, pixels are linked to subobjects, which are combined to form data objects that are classified into morphologically accurate categories. For example, the class network 56 defines a subclass of nuclei as being "TexturedNuclei" 57. System 10 has accurately identified particular data objects as belonging to the class of textured nuclei 57. System 10 has associated a color with each of the classes and subclasses in the class network 56 at the right side of graphical user interface 14. Each of the data objects that belongs to the class of textured nuclei 57 is depicted in the lower row of images with the color of the subclass assigned by the class network. FIG. 10 also shows objects in the lower row of images that are displayed with the color of the subclass "HomogeneousNuclei" 58 assigned by the class network 57. Thus, system 10 has also accurately identified particular data objects as belonging to the class of homogeneous nuclei 58. It is very difficult with the naked eye to distinguish the nuclei in learning tile 55 that contain textured DNA from those whose DNA is more homogeneously disbursed. However, the homogeneous and textured nuclei can easily be distinguished from one another in the segmented image below learning tile 55 because the two subclasses of nuclei are assigned different colors.

In step 35, system 10 determines characteristics of the objects that belong to the various classes of objects. For example, system 10 determines the distinguishing characteristics that identify the data objects classified as textured nuclei. Other characteristics identify those data objects classified as homogeneous nuclei. Examples of characteristics of a class of data objects include: the elliptical fit of the objects, the average number of concavities of the perimeter of the objects, the average size of the objects, the variation in sizes of the objects of the class, the average color of the objects, the average color of subobjects within the objects, the average intensity of the objects, the amount of intensity variation within each of the objects, and the amount of variation of the average intensity of the objects of the class. The elliptical fit of an object, for example, is the deviation from a circular or elliptical shape of the object. A long object would have a poor elliptical fit. An object with multiple branches would also have a poor elliptical fit, but that object would also be characterized by its number of concavities or indentations between the branches. Object-oriented image analysis can be programmed to recognize objects having subobjects with a selected color. For example, objects can be segmented into nuclei whose perimeters have the selected color of a biomarker or stain.

In step 36, system 10 generates pixelwise descriptors that indicate the object class to which each pixel of the learning tiles 51-55 most probably belongs. The pixelwise descriptors indicate the most likely object class associated with each pixel without referencing any data objects. Instead, purely pixel-oriented image analysis is performed using the descriptors. The pixelwise descriptors indicate the probability that a characterized pixel belongs to a class of objects based on a characteristic of a second pixel or group of pixels at a predetermined offset from the characterized pixel. The pixelwise descriptors are used in random forest decision trees to indicate the probability that each pixel of each learning tile belongs to a particular class of objects. The class probability of each pixel is calculated using multiple decision trees of pixelwise descriptors. Then the average of the probabilities is taken as the result. The various decision trees are trained with random different pixels from the learning tiles so that the average probability of belonging to a particular object class in the execution mode is obtained from a random forest of decision trees in which overfitting to particular training pixels is avoided. Each decision tree is trained on a different random set of pixels. The average result from multiple random forest decision trees provides a more accurate classification result on the pixels outside of the learning tiles. In one embodiment, an average probability of a pixel belonging to the selected object classes is calculated using twenty random forest decision trees.

Figure 11:
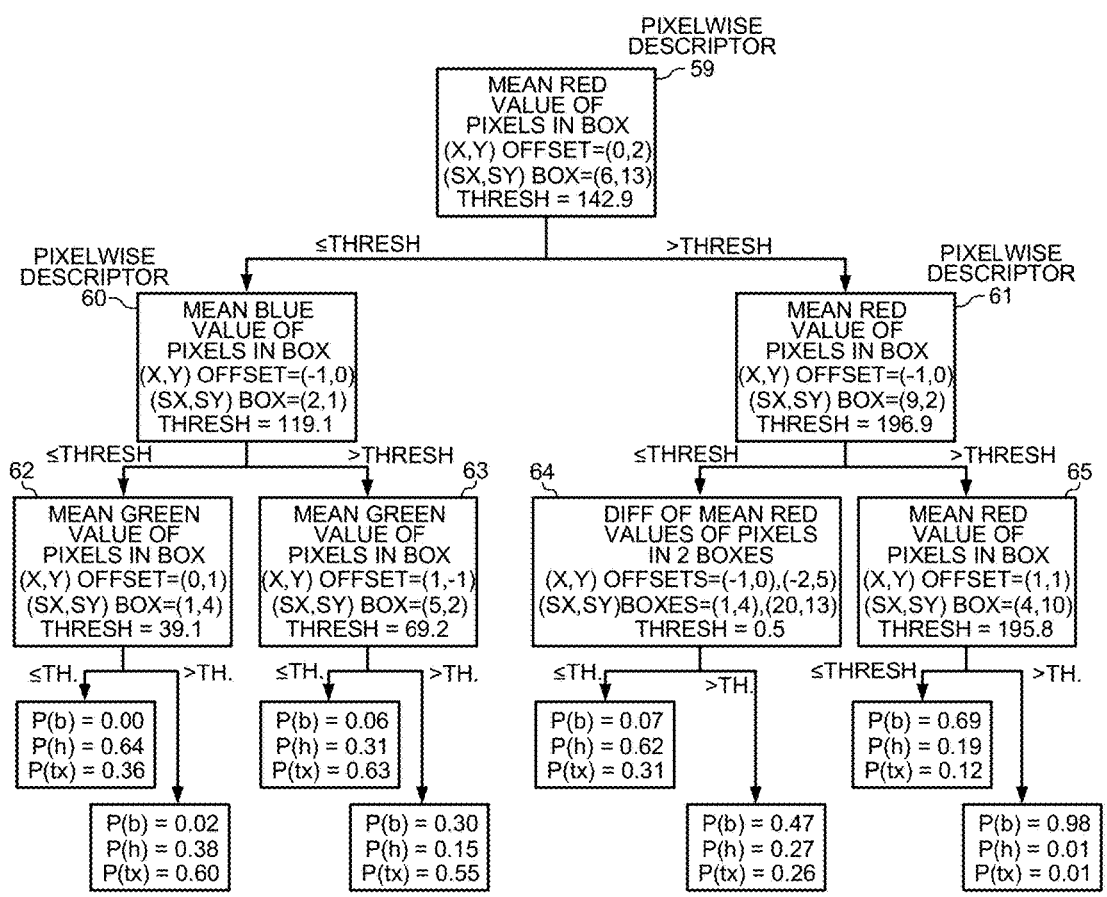
FIG. 11 is a schematic diagram of a decision tree with pixelwise descriptors used to determine the probability that a pixel belongs to an object class.

FIG. 11 is a schematic diagram illustrating how pixelwise descriptors 59-64 are applied in one of the random forest decision trees to determine the probability that a pixel belongs to one of three exemplary object classes. The selected classes are: nuclei with homogeneous contents (h), nuclei with textured contents (tx) (due to dense regions of chromatin) and background objects (b). System 10 trains on random pixels from the learning tiles 51-55 in order to match the class indicated by object-oriented analysis by choosing the appropriate pixelwise descriptors and coefficients of those descriptors to use in pixel-oriented analysis. System 10 matches the class indicated by object-oriented analysis by choosing the type of pixelwise descriptors, the order in which those descriptors are applied in the decision trees, the location of the pixels that are being compared and the comparison threshold used to make each decision.

Figure 12:
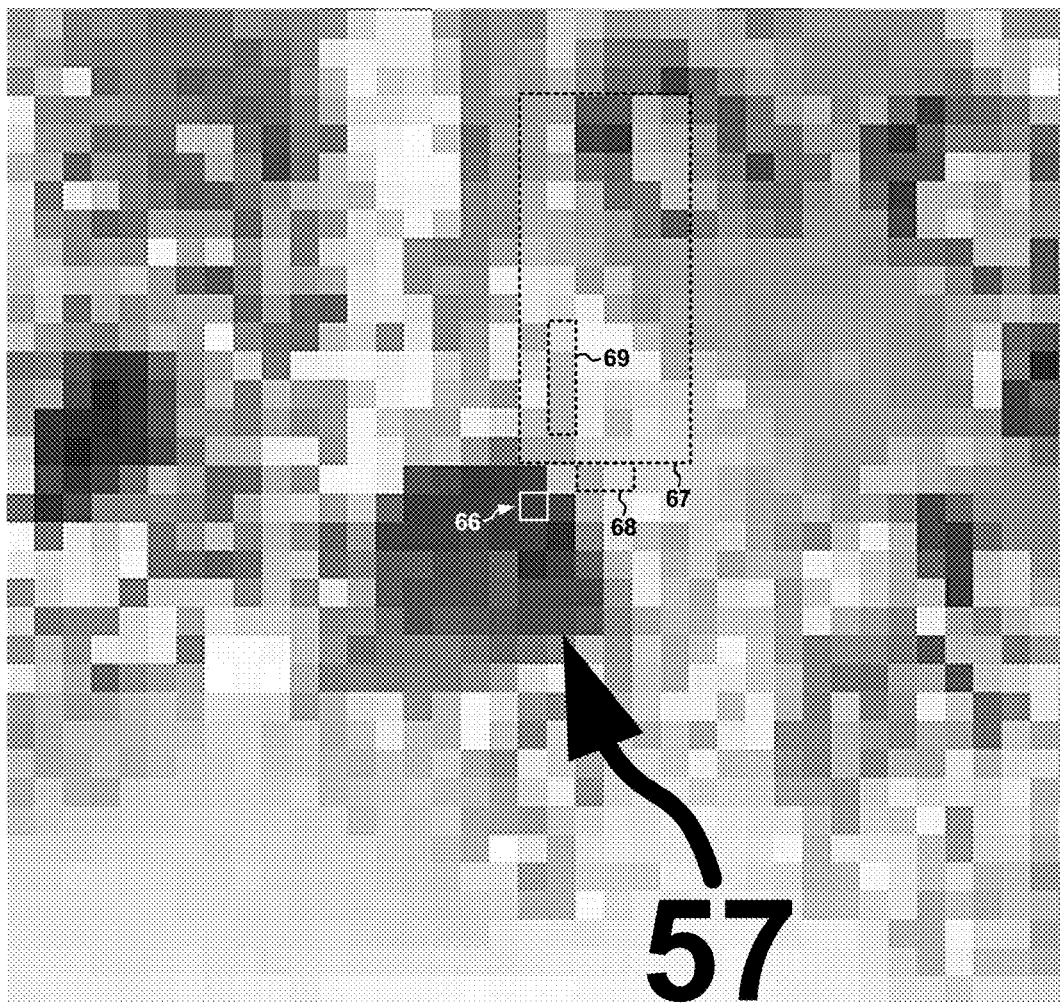
FIG. 12 shows a matrix of pixels including a characterized pixel and a larger box of pixels whose lower left corner is offset from the characterized pixel by two pixels in the y dimension.

In a hypothetical training of the pixelwise descriptors 59-64 on the pixels of learning tile 55, each pixel is first analyzed by pixelwise descriptor 59. Descriptor 59 determines the average red value of the pixels in a 6×13 box of pixels that is offset from the characterized pixel by two pixels in the y dimension (0,2). FIG. 12 illustrates the characterized pixel 66 and the box 67 of pixels whose lower left corner is offset from characterized pixel 66 by zero pixels in the x dimension and two pixels in the y dimension. Pixel 66 belongs to one of the textured nuclei 57 in the segmented image below learning tile 55 in FIG. 10. In this hypothetical implementation, the average red value of the pixels in box 67 is less than the threshold value of 142.9. Therefore, the analysis proceeds along the branch of the decision tree to pixelwise descriptor 60. Descriptor 60 determines the average blue value of the pixels in a 2×1 box 68 of pixels that is offset from characterized pixel 66 by two pixels in the x dimension and one pixel in the y dimension. FIG. 12 also shows box 68 used for the determination of the blue value of the pixels. In this example, the average blue value of the pixels in box 68 is less than the threshold value of 119.1, so the analysis proceeds along the branch of the decision tree to pixelwise descriptor 62. Descriptor 62 determines the average green value of the pixels in a 1×4 box 69 of pixels that is offset from characterized pixel 66 by one pixel in the x dimension and four pixels in the y dimension. In this case, the average green value of the pixels in box 69 is greater than the threshold value of 39.1, so the decision tree of pixelwise descriptors indicates that characterized pixel 66 most probably belongs to the class of objects associated with nuclei that have textured contents. Thus, the decision tree has been correctly trained to indicate the object class determined by object-oriented segmentation.

The decision tree of pixelwise descriptors outputs the posterior probabilities that each pixel belongs to a selected group of object classes, in this example textured nuclei (tx), homogeneous nuclei (h) and background objects (b). The output probabilities are normalized so that the sum of the probabilities of belonging to a class within the selected object classes is 100%. The decision tree indicates that the probability P(tx) that characterized pixel 66 belongs to the object class of textured nuclei 57 is 60%. This pixel-oriented classification corresponds to the result of the object-oriented segmentation shown in FIG. 10 in the segmented image below learning tile 55. Characterized pixel 66 belongs to the textured nucleus 57 at the end of an arrow in FIG. 10. The decision tree predicts that characterized pixel 66 has a 38% probability P(h) of belonging to the object class of homogeneous nuclei and a 2% probability P(b) of belonging to an object class of background objects.

In this embodiment, nineteen other decision trees of pixelwise descriptors are also trained to predict that other random training pixels in the learning tiles have the greatest probability of belonging to those object classes indicated by object-oriented segmentation. Each random forest decision tree of pixelwise descriptors is trained so that, for all of the training pixels of the learning tiles, the same order of descriptors with the same offsets, boxes, thresholds and other coefficients output a highest probability object class that matches the object class determined through object-oriented image analysis in steps 32-33. The parameters of each decision tree are modified during the training mode until the predicted object class for each randomly selected training pixel matches the class of the object to which the training pixel belongs in the hierarchical network 16 generated by object-oriented pixel analysis. The best match is achieved when the highest probability class for all of the selected training pixels is correct, and those indicated probabilities are closest to 100%. The parameters that are modified to achieve the best match are (i) the comparison threshold at each pixelwise descriptor, (ii) the offset of the pixels being compared, (iii) the size and shape of the box of pixels being compared, (iv) the quality of the pixels that is being compared (e.g., average color value), and (v) the order in which the pixelwise descriptors are placed in each decision tree.

The pixelwise descriptors can be more complex than merely comparing an average color value to a threshold. For example, pixelwise descriptor 64 calculates the difference of the average color values in two offset boxes and then compares the difference to a threshold. Yet other pixelwise descriptors compare a threshold to other pixel values, such as (i) the color value of a second pixel at a predetermined offset, (ii) the difference between the color value of the characterized pixel and the color value of a second pixel at a predetermined offset, (iii) the standard deviation among the color values of pixels in a box of predetermined size at a predetermined offset from the characterized pixel, (iv) the difference between the standard deviations of the pixels in two boxes, (v) the sum of the gradient magnitude of the color values of pixels in a box of predetermined size at a predetermined offset from the characterized pixel and at a predetermined orientation, and (vi) the orientation of the gradient edge of the color values of pixels in a box of predetermined size at a predetermined offset from the characterized pixel.

In step 37, the image analysis program then applies the pixel-oriented image analysis of the decision trees of pixelwise descriptors to each of the pixels of the original digital image 46 of stained tissue, including the pixels that are not in learning tiles 51-55 on which object-oriented image analysis was performed. In step 37, without again segmenting digital image 46 into objects, a pixel heat map is generated by applying the pixelwise descriptors to each pixel of the digital image and by assigning to each pixel the color associated with the class of objects to which that pixel most probably belongs. For example, a pixel in image 46 is assigned the color associated with the object class "homogeneous nuclei" in the class network 56 if the decision trees of pixelwise descriptors indicate that the pixel has the greatest probability of belonging to that object class. By assigning object classes to pixels without having to segment those pixels into objects, the superior segmentation results of object-oriented image analysis can be applied to the entire high-resolution digital image 46 in a much less computationally intensive manner. Digital images of stained tissue slices with tens of billions of pixels can be analyzed with the pixelwise descriptors in 3-5 hours as opposed to in about ten hours using full object-oriented processing.

Figure 13:
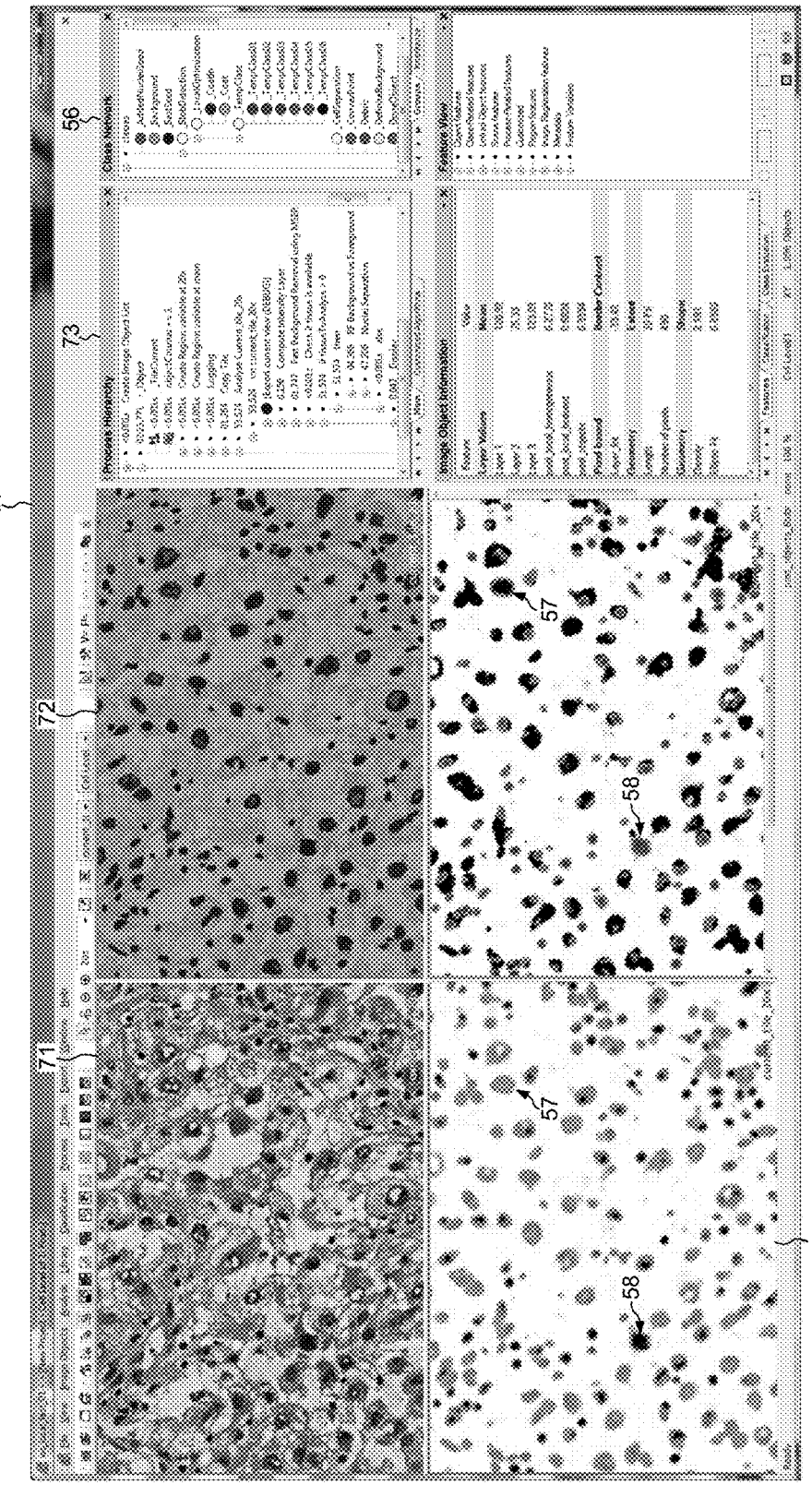
FIG. 13 is a screenshot of the graphical user interface of the system of FIG. 1 with a heat map in which pixels are assigned the colors associated with the object class to which the pixel most probably belongs.

In step 38, the pixel heat map generated in step 37 is displayed on graphical user interface 14. FIG. 13 is a screenshot of graphical user interface 14 showing a pixel heat map 70 in the bottom left frame. Heat map 70 was generated by applying pixelwise descriptors to the original image 71 of stained tissue, a portion of which is shown in the upper left frame. The pixels of heat map 70 are assigned the colors associated with only three object classes: the lighter homogeneous nuclei 57, the darker textured nuclei 58, and white background objects. By outputting posterior probabilities of belonging to only the selected three object classes, extraneous information is removed from heat map 70. The background objects are assigned the color white so that the textured nuclei can more easily be distinguished from the homogeneous nuclei. This pixel-oriented analysis based on a limited number of object classes provides a clearer presentation to a pathologist who is grading and scoring images of stained tissue samples.

The textured nuclei result from chaotically organized chromatin within the nucleus, which is indicative of renal cell carcinoma (RCC) within the stained tissue. Note that the pixels of heat map 70 that have been identified as belonging to the object class "textured nuclei" are associated with nuclei based on characteristics in addition to just the texture of the chromatin. The pixelwise descriptors were trained to match the object-oriented classification of textured nuclei, which also was based on characteristics of objects as opposed to pixels, such as the size of the object, the elliptical fit of the object and the regularity of the object perimeter (concavities in the perimeter). These object characteristics are reflected in the pixelwise descriptors and are recognized in individual pixels. Because the analysis of each pixel is performed independently in the pixel-oriented analysis, segmentation errors are not incorporated into subsequent steps as they are in object-oriented analysis, and the overall classification error rate in the image analysis is reduced.

In FIG. 13, the image frame 72 to the right of original image 71 shows the result of object-oriented segmentation on the original image 71. To the right of image frame 72 is the process hierarchy 73 that lists the steps of the object-oriented analysis used in the segmentation. The class network 56 is shown in the upper right frame of the graphical user interface 14 of FIG. 13. The colors assigned to the classes of objects have not been specially chosen to distinguish the textured nuclei class from the homogeneous nuclei class, so both types of nuclei appear as darker objects. The lower right image frame shows the object-oriented segmentation of frame 72 with a white background and added contrast. It is apparent that textured nuclei 57 can more easily be distinguished from homogeneous nuclei 58 in heatmap 70 than in the lower right image frame.

Figure 14:
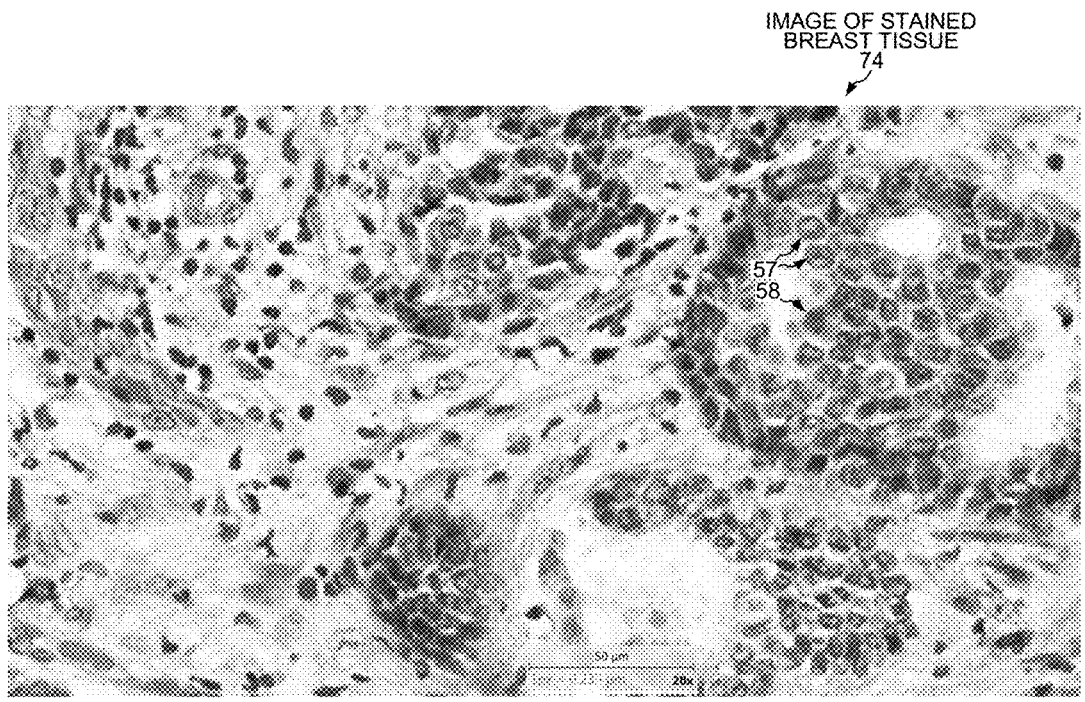
FIG. 14 shows a digital image of a slice of breast tissue stained with hematoxylin and eosin (H&E).
Figure 15:
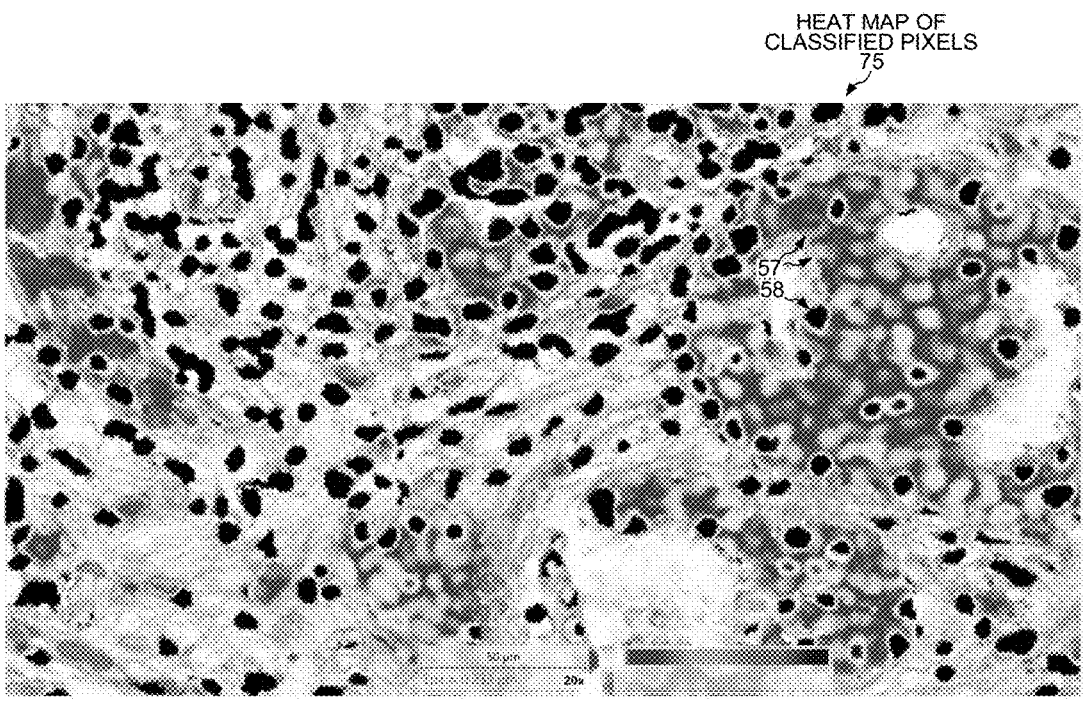
FIG. 15 is a heat map as displayed on the graphical user interface of the system of FIG. 1 after being generated from the image of FIG. 14 using the method of FIG. 3.

FIG. 14 shows a digital image 74 of a slice of breast tissue stained with hematoxylin and eosin (H&E). FIG. 15 is a heat map 75 as displayed on graphical user interface 14 after being generated from image 74 using method 24 of FIG. 3. Object-oriented image analysis is used to segment a small portion of image 74 into the class of textured nuclei 57 and the class of homogeneous nuclei 58. Using method 24, multiple random forest decision trees are generated with pixelwise descriptors that indicate the class of objects to which each of the pixels in the remainder of image 74 most probably belongs. The pixels of the remainder of image 74 are assigned object classes without segmenting the remainder of the image into objects. Heat map 75 is generated by assigning to each pixel of image 74 the color associated with the object class to which that pixel most probably belongs. Thus, no objects are displayed in heat map 75. Instead, contiguous pixels that are assigned the color of the same object class appear to the human observer as objects. Although it is difficult visually to recognize and distinguish the two kinds of nuclei in the original image 74, the darker homogeneous nuclei 58 are readily distinguishable from the lighter textured nuclei 57 in heat map 75.

In FIG. 14, the pixels that most probably belong to the object class of textured nuclei 57 are assigned a shade of the color associated with the class "TexturedNuclei" depending on the magnitude of the probability of belonging to that class. Thus, pixels with a higher probability of belonging to the class "TexturedNuclei" are darker than pixels that most probably belong to that class but yet have a lesser probability of belonging. The differing probabilities of pixels belonging to the class "TexturedNuclei" is demonstrated by the lightest pixels that are likelier to belong to the class of textured nuclei 57 which immediately surround the darker homogeneous nuclei 58.

Figure 16:
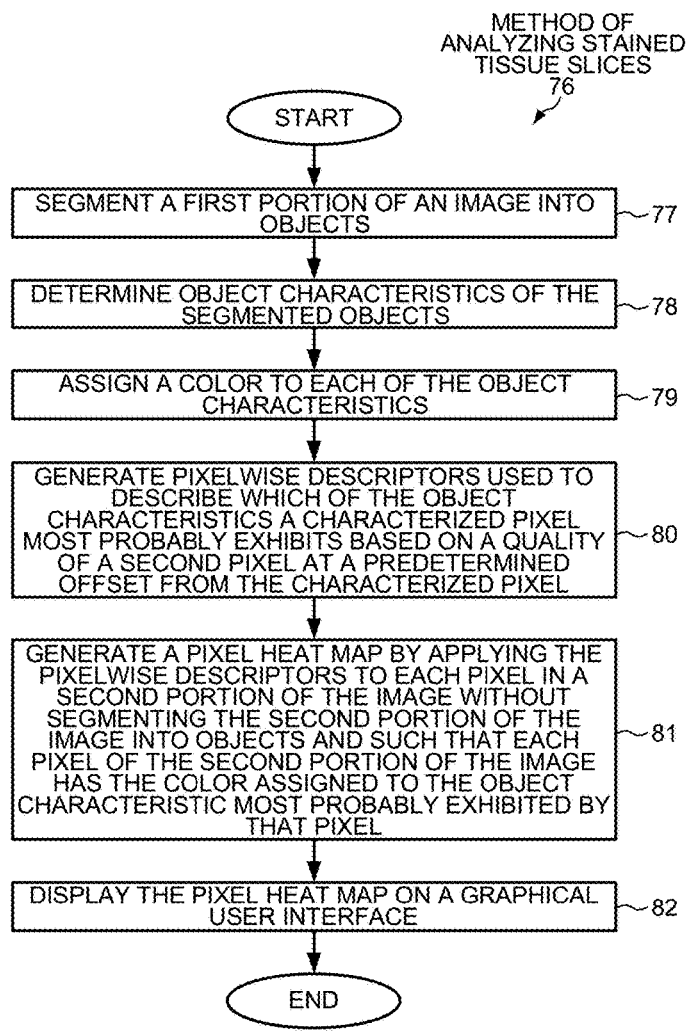
FIG. 16 is a flowchart of the steps of another method by which the system of FIG. 1 trains pixelwise descriptors to indicate the probability that individual pixels in one portion of an image exhibit object characteristics determined by segmenting another portion of the image using object-oriented image analysis.

FIG. 16 is a flowchart of steps 77-82 of another method 76 in which pixelwise descriptors are trained to indicate the probability that individual pixels in one portion of an image exhibit object characteristics determined by segmenting another portion of the image using object-oriented image analysis. Instead of indicating the probability that each characterized pixel belongs to a selected object class, as performed by method 24 of FIG. 3, method 76 generates decision trees with pixelwise descriptors that indicate (i) the object characteristic most probably exhibited by the characterized pixel or (ii) the degree to which the characterized pixel exhibits a selected object characteristic.

Figure 17:
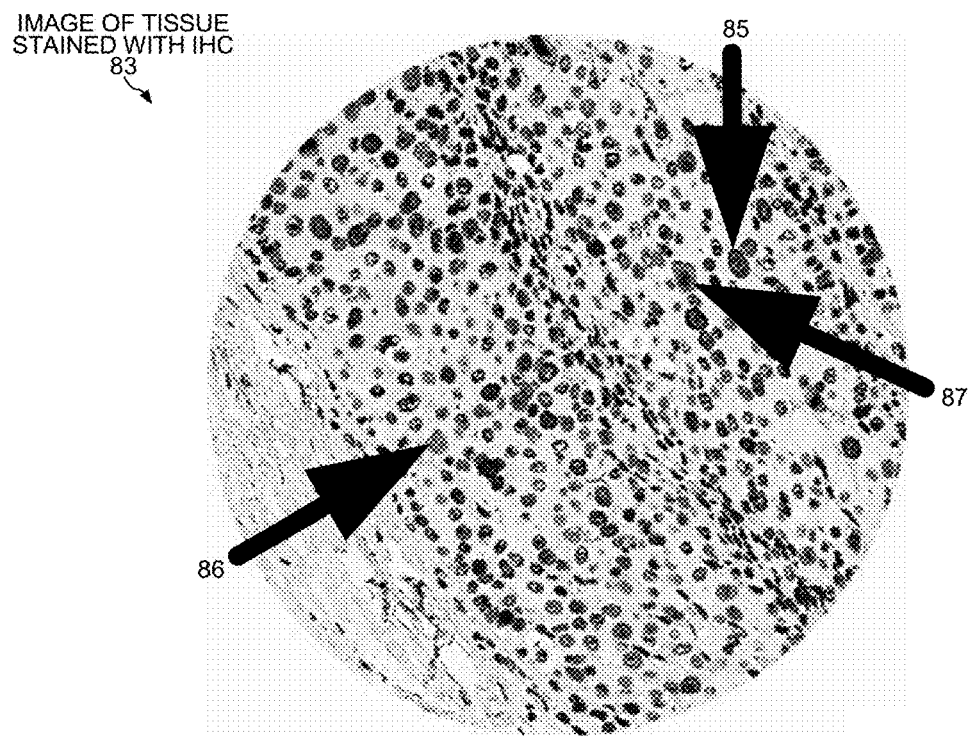
FIG. 17 shows a digital image of breast tissue that has been stained with a protein-specific antibody using immunohistochemistry (IHC).

In step 77, a first portion of an image is segmented into data objects using object-oriented image analysis. FIG. 17 shows a high-resolution image 83 of breast tissue that has been stained with a protein-specific antibody using immunohistochemistry (IHC). For example, cells whose membranes have the HER2 protein are stained brown when the antibody with a brown dye binds to the transmembrane protein HER2/neu. Cells are stained to differing degrees depending on the amount of HER2 protein in their membranes. A small first portion of image 83 is segmented using object-oriented image analysis into data objects classified into various classes, including positively stained cells with HER2 overexpression, cells that do not exhibit HER2 overexpression and background objects.

In step 78, system 10 determines object characteristics of the segmented objects in the first portion of image 83. For example, the object-oriented image analysis determines the elliptical fit of the positively stained cells, the average number of concavities in the perimeters of the positively stained cells, the average size of the positively stained cells, the variation in the sizes of the positively stained cells, the average color of the positively stained cells, the average color of the membranes of the positively stained cells, the average intensity of the positively stained cells, the amount of intensity variation within each of the positively stained cells, and the amount of variation of the average intensity of the positively stained cells. In addition, the object-oriented image analysis quantifies the degree to which the membranes of the positively stained cells have the HER2 protein.

In step 79, system 10 assigns a color to each of the object characteristics determined in step 78. For example, large positively stained cells can be assigns the color orange, while small positively stained cells can be assigned the color green. In addition, positively stained cells with a higher proportion of their membranes stained can be assigned a darker shade of a color, while positively stained cells with a lower proportion of their membranes stained can be assigned a lighter shade of that color.

In step 80, pixelwise descriptors are generated that describe which of the object characteristics a characterized pixel most probably exhibits based on a quality of a second pixel or box of pixels at a predetermined offset from the characterized pixel. Alternatively, the pixelwise descriptors indicate the degree to which the characterized pixel exhibits a selected object characteristic.

In step 81, a pixel heat map is generated by applying the pixelwise descriptors to each pixel in a second portion of the image without segmenting the second portion of the image into objects. Each pixel of the second portion of the image has the color assigned to the object characteristic most probably exhibited by that pixel. Alternatively, each pixel of the second portion of the image has a shade of color indicative of the degree to which the characterized pixel exhibits a selected object characteristic.

Figure 18:
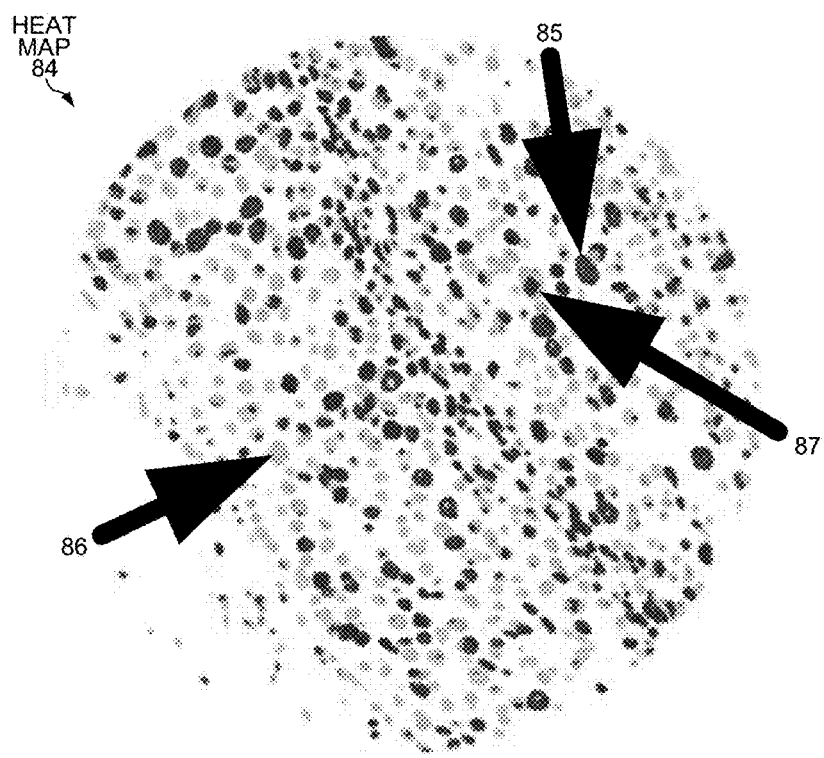
FIG. 18 shows a pixel heat map generated by applying decision trees with pixelwise descriptors to the pixels of a portion of the image of FIG. 17 that has not been segmented into objects.

In step 82, system 10 displays the pixel heat map on graphical user interface 14. FIG. 18 shows a pixel heat map 84 generated by applying decision trees with pixelwise descriptors to the pixels of a second portion of image 83 that has not been segmented into objects. Segmenting using object-oriented image analysis was performed only on a small number of learning tiles (not shown) in FIG. 17. The pixel-oriented analysis using decision trees with pixelwise descriptors is then applied to the entire image 83, including the second portion that was not included in the learning tiles.

In FIG. 18, heat map 84 includes darker shade pixels, lighter shade pixels, and white background pixels. The darker shade pixels have been assigned the color associated with the object characteristic of more membrane staining. The darker shade indicates that the pixel is most probably associated with a positively stained cell having a higher proportion of its membrane stained. The lighter shade pixels have been assigned the color associated with the object characteristic of less membrane staining. The lighter shade indicates that the pixel is most probably associated with a positively stained cell with a lower proportion of its membrane stained.

Three positively stained cells 85-87 are marked in original image 83 in FIG. 17 to illustrate that the color assigned to each pixel of heat map 84 in FIG. 18 corresponds to the degree an object characteristic is exhibited as opposed to merely the class of object. Each of cells 85-87 in image 83 is positively stained brown using IHC. Thus, the membranes of each of the cells 85-87 include the transmembrane protein HER2/neu which is stained with a protein specific antibody with a brown die. However, the degree to which the cell membranes are stained is different. The pixels in heat map 84 at the location of cell 85 have a darker shade indicating that the pixels most probably belong to a cell with a higher proportion of its membrane stained. The pixels in heat map 84 at the location of cell 86 have a lighter shade indicating that the pixels most probably belong to a cell with a lower proportion of its membrane stained. But not all pixels at the location of cell 87 have the same shade. Some of the pixels have a darker shade and have a higher probability of belonging to a cell with more of its membrane stained, while other pixels at the location of cell 87 have a lighter shade and higher probability of belonging to a cell with less of its membrane stained. Thus, the color shades in heat map 84 do not indicate pixels that belong to the object class of positively stained cells and the object class of unstained cells. Instead, the color shades in heat map 84 indicate the degree of a characteristic exhibited by a positively stained cell to which each pixel is most likely associated.

A higher level heat map can easily be generated from a heat map that assigns a color to each pixel depending on the most likely degree to which an object characteristic is exhibited at the location of the pixel. For example, the average value of multiple pixels in heat map 84 can be combined to form a single pixel of the higher level heat map. The shade of each pixel of the higher level heat map indicates an area of the original image 83 in which the cells have a higher or lower proportion of their membranes immunohistochemically stained. A pathologist could use the higher level heat map to navigate to the locations in image 83 that include the highest proportion of cancerous breast tissue cells that exhibit a high degree of HER2 overexpression.

In another example, the object characteristic indicated by the decision trees of pixelwise descriptors is the size of the nuclei. Pixels most probably belonging to larger nuclei are assigned a different color than pixels most probably belonging to smaller nuclei. Pixels in the higher level heat map indicate the locations in the original image in which the nuclei are larger and more likely to be cancerous.

Data analysis server 13 includes a computer-readable storage medium having program instructions thereon for performing method 24 and method 76. Such a computer-readable storage medium includes instructions of the image analysis program for generating data objects corresponding to patterns in digital images that have been stained by a particular biomarker. The computer-readable storage medium also includes instructions for generating decision trees of pixelwise descriptors that indicate the probability that a pixel belongs to an object class without segmenting the portion of the image in which the pixel is located.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   segmenting a first portion of an image into objects of a data network that belong to classes, wherein the segmenting the first portion of the image into objects involves generating the data network in which the objects are linked to selected pixels of the first portion of the image, wherein at least one of the objects is linked to a plurality of subobjects, and wherein each of the subobjects is linked to other subobjects or to pixels of the image;
   determining class characteristics of each of the classes of objects;
   assigning a color to each of the classes of objects;
   generating pixelwise descriptors used to describe which pixels are associated with particular classes of objects;
   generating a pixel heat map by applying the pixelwise descriptors to each pixel in a second portion of the image without segmenting the second portion of the image into objects of any data network, wherein each pixel of the second portion of the image has the color assigned to the class of objects that the pixelwise descriptors indicate is most probably associated with that pixel; and
   displaying the pixel heat map on a graphical user interface.

2. The method of claim 1, wherein a first class characteristic of a first class of objects is an elliptical fit of the objects of the first class, and wherein the pixelwise descriptors indicate that a characterized pixel is most probably associated with the objects of the first class that exhibit a particular elliptical fit without ever segmenting the second portion of the image into objects whose elliptical fit can be determined.

3. The method of claim 2, wherein no pixels of the second portion of the image are linked to objects of any data network.

4. The method of claim 1, wherein the image depicts a tissue slice that has been immunohistochemically stained for the expression of a protein.

5. The method of claim 1, wherein one of the classes of objects represents nuclei that have been stained by hematoxylin and eosin (H&E).

6. The method of claim 1, wherein the characteristics of a class of objects are taken from the group consisting of: an average number of concavities of the objects of the class, an average size of the objects of the class, a variation in sizes of the objects of the class, an amount of intensity variation within the objects of the class, an elliptical fit of the objects of the class, and an average intensity of the objects of the class.

7. The method of claim 1, wherein the pixelwise descriptors for a characterized pixel are taken from the group consisting of: a color value of a second pixel at a predetermined offset, a difference between a color value of the characterized pixel and of a second pixel at a predetermined offset, an average of the color values of pixels in a box of predetermined size at a predetermined offset from the characterized pixel, a standard deviation among the color values of pixels in a box of predetermined size at a predetermined offset from the characterized pixel, a sum of gradient magnitude of the color values of pixels in a box of predetermined size at a predetermined offset from the characterized pixel, and an orientation of a gradient edge at a predetermined offset.

8. The method of claim 1, wherein the pixelwise descriptors are used in a random forest decision tree to indicate the probability that a characterized pixel whose surrounding pixels are defined by the pixelwise descriptors belongs to a particular class of objects.

9. The method of claim 1, wherein each of the pixelwise descriptors indicates a probability that a characterized pixel belongs to a particular class of objects based on a characteristic of a second pixel at a predetermined offset from the characterized pixel.

10. The method of claim 1, wherein the color assigned to each class of objects is a shade of gray.

11. The method of claim 1, wherein one of the class characteristics of one of the classes of objects defines a characteristic shape of the objects of the class.

12. A method comprising:
    segmenting a first portion of an image into network objects of a data network that belong to classes, wherein the image depicts a slice of tissue from a cancer patient that has been stained, wherein the segmenting involves generating the data network in which the network objects are linked to selected pixels of the image, wherein at least one of the network objects is linked to a plurality of network subobjects, and wherein each of the network subobjects is linked to other network subobjects or to pixels of the image;
    determining class characteristics of each of the classes of network objects;
    assigning a color to each of the classes of network objects;
    generating pixelwise descriptors used to describe which pixels are associated with particular classes of network objects; and
    generating a pixel heat map by applying the pixelwise descriptors to each pixel in a second portion of the image without segmenting the second portion of the image into network objects of any data network, wherein each pixel of the second portion of the image has the color assigned to the class of network objects that the pixelwise descriptors indicate is most probably associated with that pixel.

13. The method of claim 12, wherein the tissue has been immunohistochemically stained for the expression of a protein.

14. The method of claim 12, wherein the tissue has been stained by hematoxylin and eosin (H&E).

15. The method of claim 12, wherein each of the pixelwise descriptors indicates a probability that a characterized pixel belongs to a particular class of network objects based on a characteristic of a second pixel at a predetermined offset from the characterized pixel.

16. A method comprising:

segmenting a first portion of an image into objects of a data network using object-oriented image analysis, wherein a second portion of the image is not segmented into objects of the data network, wherein the objects of the data network are linked to subobjects of the data network and to selected pixels of the first portion of the image;

defining classes of objects, wherein each of the objects belongs to one of the classes of objects;

determining class characteristics of each of the classes of objects, wherein one of the class characteristics of a first class of objects defines a characteristic shape of the objects of the first class;

assigning a color to each of the classes of objects;

generating pixelwise descriptors used to describe which pixels are associated with particular class characteristics of classes of objects;

performing pixel-oriented image analysis by applying the pixelwise descriptors individually to each pixel in the second portion of the image, wherein the pixelwise descriptors associate a first pixel in the second portion of the image with the characteristic shape of the objects of the first class;

generating a pixel heat map in which each pixel of the second portion of the image has the color assigned to the class of objects that the pixelwise descriptors indicate is most probably associated with that pixel; and displaying the pixel heat map on a graphical user interface.

17. The method of claim 16, wherein the class characteristics of the first class of objects are taken from the group consisting of: an elliptical fit of the objects of the class, an average number of concavities of the objects of the class, an average size of the objects of the class, and a variation in sizes of the objects of the class.

18. The method of claim 16, wherein the image depicts a tissue slice that has been immunohistochemically stained for the expression of a protein.

19. The method of claim 16, wherein one of the classes of objects represents nuclei that have been stained by hematoxylin and eosin (H&E).

20. The method of claim 16, wherein each of the pixelwise descriptors indicates a probability that a characterized pixel belongs to a particular class of objects based on a characteristic of a second pixel at a predetermined offset from the characterized pixel.

\* \* \* \* \*